(12) United States Patent
Jang

(10) Patent No.: US 6,721,574 B1
(45) Date of Patent: Apr. 13, 2004

(54) MULTI-DESTINATION TRANSMISSION METHOD OF A SHORT MESSAGE FOR A MOBILE STATION

(75) Inventor: Ki-Tae Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 09/614,710

(22) Filed: Jul. 12, 2000

(30) Foreign Application Priority Data

Jul. 12, 1999 (KR) ........................................ 1999-28085

(51) Int. Cl.$^7$ ................................................ H04Q 7/20
(52) U.S. Cl. .................... 455/466; 455/422.1; 455/455; 455/403; 370/349
(58) Field of Search ............................... 455/466, 422, 455/445, 507, 518, 519, 403; 370/349

(56) References Cited

U.S. PATENT DOCUMENTS

| | | | | |
|---|---|---|---|---|
| 5,663,820 A | * | 9/1997 | Shiragaki .................... | 359/128 |
| 5,878,351 A | * | 3/1999 | Alanara et al. ............. | 455/466 |
| 5,977,880 A | * | 11/1999 | Aoki ..................... | 340/825.44 |
| 6,091,961 A | * | 7/2000 | Khalil ........................ | 455/466 |
| 6,094,587 A | * | 7/2000 | Armanto et al. ............ | 455/567 |
| 6,124,947 A | * | 9/2000 | Seo ............................. | 358/405 |
| 6,289,223 B1 | * | 9/2001 | Mukherjee et al. ......... | 455/466 |
| 6,327,475 B1 | * | 12/2001 | Fujimori et al. ............ | 455/458 |

* cited by examiner

Primary Examiner—William Trost
Assistant Examiner—Danh Le
(74) Attorney, Agent, or Firm—Cha & Reiter, L.L.C.

(57) ABSTRACT

A multi-destination transmission method for transmitting a short message to a plurality of mobile terminals at the receiving end is provided. According to the method, a plurality of telephone numbers corresponding to a plurality of mobile terminals at the receiving end is registered in a group. Then, if a request for multi-transmission of the short message is selected after inputting the short message, the short message is simultaneously transmitted to a plurality of the telephone numbers registered in the selected group at the receiving end.

15 Claims, 4 Drawing Sheets

MULTI-DESTINATION TRANSMISSION METHOD OF A SHORT MESSAGE FOR A MOBILE STATION

CLAIM OF PRIORITY

This application makes reference to, incorporates the same herein, and claims all benefits accruing under 35 U.S.C. Section 119 from an application for MULTI-DESTINATION TRANSMISSION METHOD OF A SHORT MESSAGE FOR A MOBILE STATION filed earlier in the Korean Industrial Property Office on Jul. 12, 1999 and there duly assigned Ser. No. 28085/1999.

BACKGROUND OF THE INVENTION

1. Field of the Invention

The present invention relates generally to a mobile terminal system, and in particular to a method for simultaneously transmitting a short message to a plurality of mobile terminals at the receiving end.

2. Description of the Related Art

In general, mobile terminals are mainly used for receiving a telephone service. However, with the new developments in the mobile terminal technologies, the terminals are also used for receiving other data services.

These days, a mobile terminal can transmit/receive a short message to/from another mobile terminal as well as other information, such as security information, traffic information, weather information, etc., through a short message service (SMS). The short message transmission/reception service enables different forms of short message to successfully transmit to a terminating mobile terminal even when the terminating mobile terminal line is busy. The short message service is available at a lower cost than the telephone service, thus the use of the short message service is progressively increasing.

However, according to the short message service as described above, the transmission/reception of the short message can be performed only in a point-to-point connection. Thus, in the event that a user intends to transmit the same message to a plurality of mobile terminals at the receiving end, the user must repeatedly transmit the same short message to respective terminating mobile terminals. The repeated transmission of the same short message is inefficient and causes much inconvenience to the user.

SUMMARY OF THE INVENTION

Accordingly, the present invention has been made in an effort to solve the problems occurring in the related art, and the object of the present invention is to provide a multi-destination transmission method for a mobile terminal that can simultaneously transmit the same short message to a plurality of mobile terminals at the receiving end.

In order to achieve the above object, according to the present invention, there is provided a multi-destination transmission method of a short message in a mobile terminal comprising the steps of: registering a group of telephone numbers corresponding to a plurality of mobile terminals for the multi-transmission of the short message; detecting a request for the multi-transmission of the short message after editing the short message; selecting whether to multi-transmit the short message; selecting a group selected for the multi-transmission among the groups of pre-registered telephone numbers if the multi-transmission is selected; and, multi-transmitting the short message to the plurality of the telephone numbers registered in the selected group when the request for the multi-transmission is detected.

BRIEF DESCRIPTION OF THE DRAWINGS

The above object and advantages of the present invention will become more apparent by describing in detail the preferred embodiments thereof with reference to the attached drawings in which.

DETAILED DESCRIPTION OF THE PREFERRED EMBODIMENTS

Reference will now be made in greater detail to the preferred embodiments of the present invention. For the purpose of clarity, a detailed description of well-known functions and configurations will be omitted as it may make the subject matter of the present invention unclear.

Figure 1:
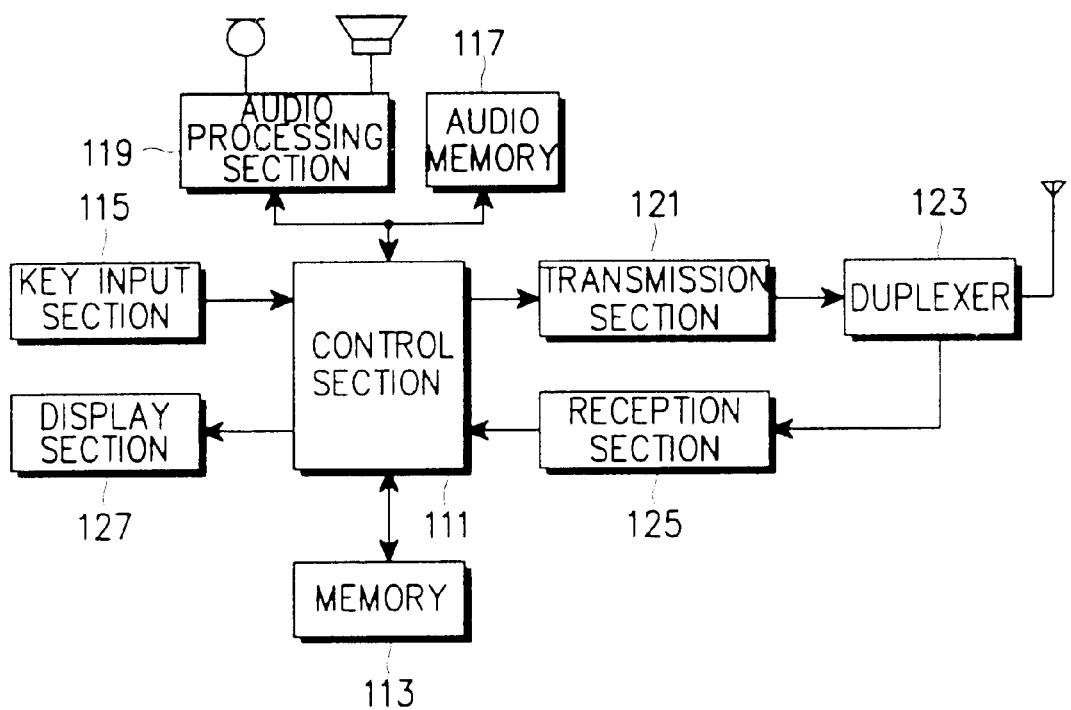
FIG. 1 is a block diagram illustrating the construction of a mobile terminal for performing a short message service according to the embodiment of the present invention.

FIG. 1 illustrates a block diagram depicting the construction of a mobile terminal for performing a short message service according to the embodiment of the present invention.

With reference to FIG. 1, a control section 111 controls the whole operation of the mobile station. A memory 113 coupled to the control section 111 stores the control programs of the mobile terminal and the control data produced according to the control operation of the control section 111. A key input section 115 coupled to the control section 111 is provided with a plurality of digit keys, a MENU key, a SEND key, etc., for generating different key signals to be transferred to the control section 111 when various keys are selected by a user.

An audio memory 117 is provided to store a plurality of audio messages. An audio processing section 119 converts the digital audio message from the audio memory 117 into a corresponding audio signal in accordance with the control of the control section 111 and outputs the converted analog audio message through a speaker. The audio processing section 117 also performs the conversion of an analog audio signal received from the user, via a microphone, into a digital signal to be stored in the audio memory 117.

A transmission section 121 is provided to receive a signal generated from the control section 111, modulates the signal as a digital radio signal, and transfers the radio signal to a duplexer 123. The duplexer 123 transmits the radio signal received from the transmission section 121 to an antenna, and also transfers the signal received through the antenna to a reception section 125. The reception section 125 demodulates the radio signal transmitted from the duplexer 123 and transfers the demodulated signal to the control section 111. Then, the control section 111 controls the telephone function in response to the received demodulated signal.

A display section 127 having a liquid crystal display unit (LCD) and light emitting diodes (LEDs) therein, displays the control data and the input data of the mobile terminal under the control of the control section 111.

Figure 2:
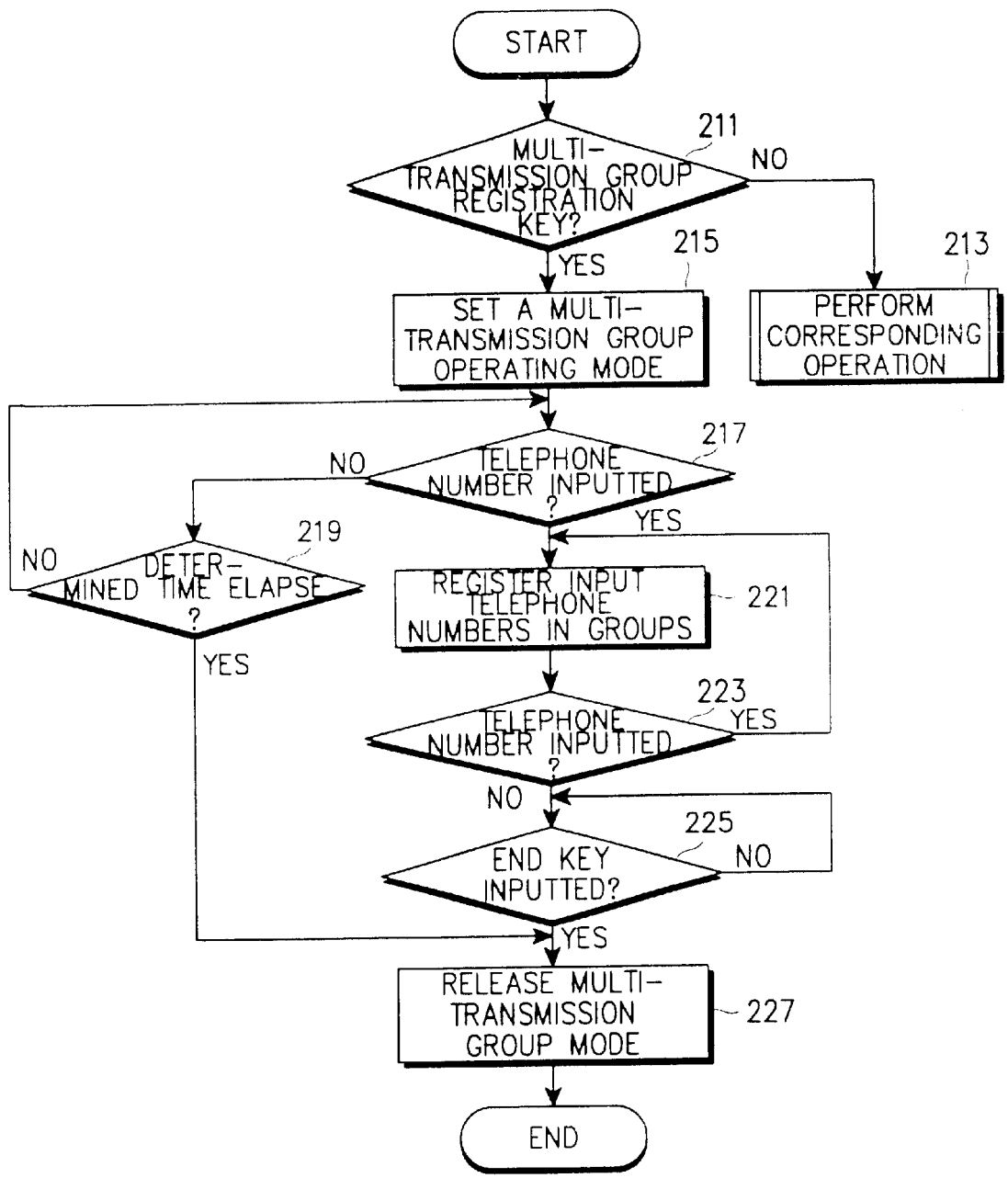
FIG. 2 is a flowchart illustrating the group-registration process for multi-transmission according to the embodiment of the present invention.

FIG. 2 shows a flowchart illustrating the group-registration process for the multi-transmission according to the embodiment of the present invention.

With reference to FIG. 2, if power is supplied to the mobile terminal as constructed in FIG. 1, the control section 111 is initialized and turns into a standby state. If any key is inputted through the key input section 115 during the standby state, the control section 111 checks whether the multi-transmission registration key is inputted. Here, the multi-transmission registration key represents the key for designating and registering a group of telephone numbers to receive the short message at the receiving end. The activation of the multi-transmission key can be achieved by a combination of different keys provided in the key input section 115. If the input key does not correspond to the multi-transmission registration key, the control section 111 proceeds to step 213. At step 213, the control section 111 performs the operation according to the activation of the input key and returns back to the standby state.

If the input key is selected for the multi-transmission registration key upon review, the control section 111 proceeds to step 215. At step 215, the control section 111 converts the mode of the mobile terminal into a multi-transmission group registration mode, then proceeds to step 217. At step 217, the control section 111 checks whether the telephone number for the group registration is inputted by scanning the key input section 215. If the key corresponding to the telephone number is not inputted, the control section 111 proceeds to step 219. At step 219, the control section 111 checks for the expiration of a predetermined time, i.e., 5 seconds. If the predetermined time has elapsed, the control section 111 proceeds to step 227. At step 227, the control section 111 releases the multi-transmission registration mode and returns to the standby state. If the predetermined time has not elapsed, the control section returns to step 217 to detect whether a telephone number is inputted by the user.

At step 217, if a telephone number is inputted, the control section 111 proceeds to step 221. At step 221, the control section 111 registers the inputted telephone number in a specified region of the memory 113 and proceeds to step 223. At step 223, the control section 111 checks if another telephone number is inputted thereafter by scanning the key input section 115. If another telephone number is inputted, the control section 111 returns to step 221 for registering the telephone number. Accordingly, a group of telephone numbers can be registered through the step 221 and step 223 processes. If no further telephone is detected in step 223, it proceeds to step 225. At step 225, the control section 111 checks if the end key is inputted in the key input section 115. If the end key is inputted, the control section 111 proceeds to step 227. At step 227, the control section 111 releases the multi-transmission registration mode and returns to the standby state.

Figure 3:
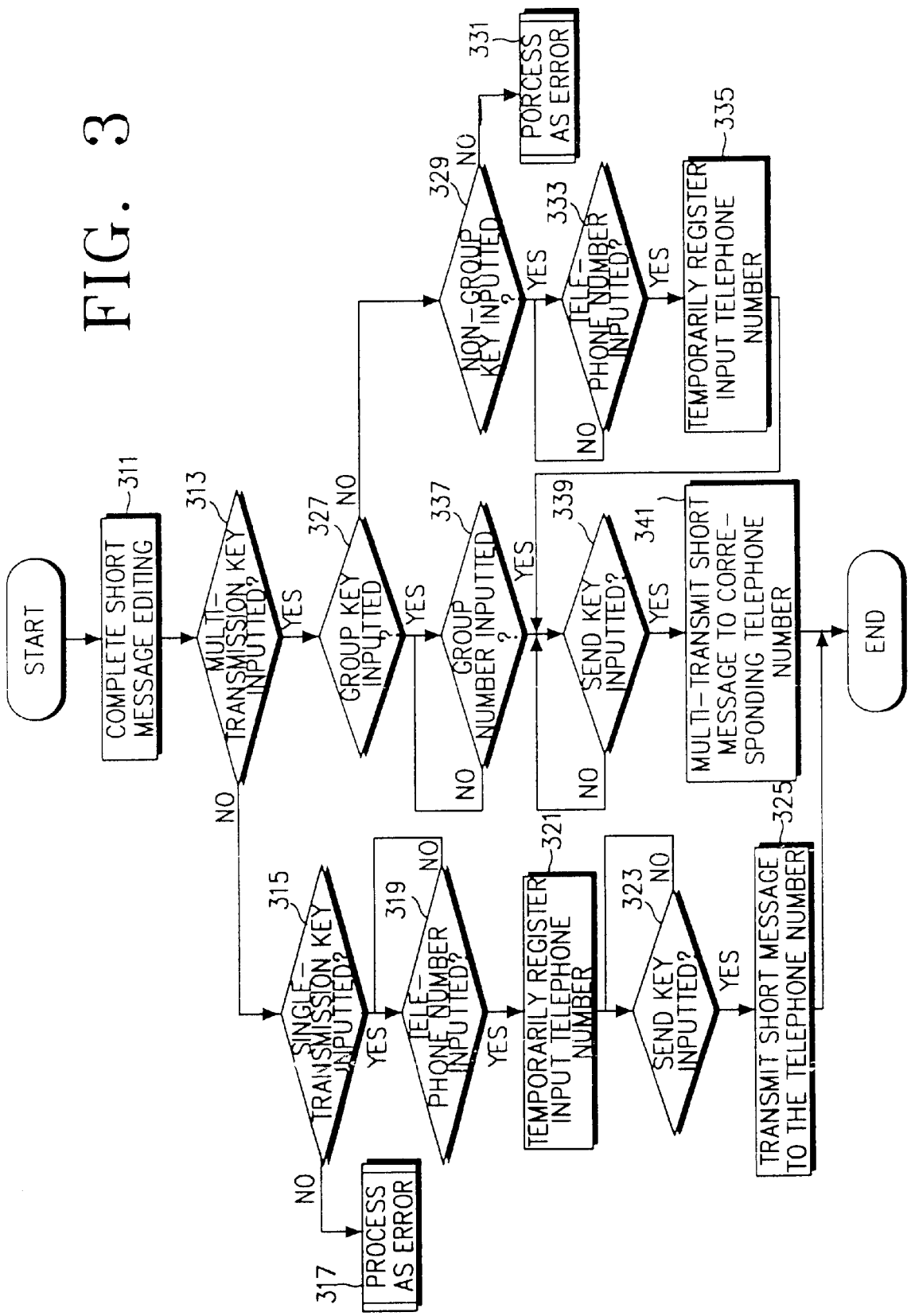
FIG. 3 is a flowchart illustrating the multi-transmission process according to the embodiment of the present invention; and, FIG. 4 is a flowchart illustrating in detail the message transmission process as illustrated in FIG. 3.

FIG. 3 is a flowchart illustrating the multi-transmission process according to the embodiment of the present invention.

With reference to FIG. 3, when a user completes editing the short message to be transmitted at step 311, the control section proceeds to step 313. At step 313, the control section 111 scans the key input section 115 and checks whether the multi-transmission key is inputted. Here, at the time when the editing of the short message is completed, the control section 111 controls the display section 127 to display a menu message for selecting either the multi-transmission or the single transmission. Accordingly, the user selects either the multi-transmission key or single transmission key in response to the menu message displayed on the display section 127. If the selected key does not correspond to the multi-transmission key, the control section 111 proceeds to step 315. At step 315, the control section 111 checks if the selected key corresponds to the single transmission key. If the input key is not the single transmission key, the control section 111 proceeds to step 317 and determines that an error is generated, then returns to the standby state.

If the select key corresponds to the single transmission key in step 315, the control section 111 proceeds to step 319. At step 319, the control section 111 scans the key input section 115 and checks if the key corresponding to the telephone number is inputted. If the key corresponding to the telephone number is inputted, the control section 111 proceeds to step 321. At step 321, the control section 111 temporarily registers the input telephone number in a specified region of the memory 113 and proceeds to step 323. At step 323, the control section 111 scans the key input section 115 and checks if the SEND key is inputted. If the SEND key is inputted, the control section 111 proceeds to step 325. At step 325, the control section 111 checks the memory 113 to retrieve the edited short message in step 311, then transmits the retrieve short message to the telephone number to be temporally registered in the memory. After the transmission of the short message, it returns to the standby state. Here, the short message with the inputted telephone number of the receiving mobile terminal is transmitted to a base station regardless of the state of the receiving mobile terminal. Thus, the receiving terminal may be busy or already in connection with another terminal but the short message is still transmitted thereto.

If the input key corresponds to the multi-transmission key in step 313, the control section 111 proceeds to step 327. At step 327, the control section 111 scans the key input section 115 and checks if the group key is inputted therefrom. Here, as the multi-transmission key is inputted, the control section 111 controls the display section 127 to display a menu option for selecting the multi-transmission of a group, which contains the previously registered telephone numbers. In case the multi-transmission is not selected, the short message is separately transmitted to respective telephone numbers as inputted by the user; thus, the control section 111 proceeds to step 329. At step 329, the control section 111 checks if the input key is a non-group key. If the input key is not the non-group key, the control section 111 proceeds to step 331. At step 331, the control section 111 processes all procedures up to now as an error and returns to the standby state. If the input key is the non-group key, the control section 111 proceeds to step 333. At step 333, the control section 111 scans the key input section 115 and checks if the key corresponding to the telephone number of the receiving mobile terminal is inputted. If the key corresponding to the telephone number is inputted, the control section 111 proceeds to step 335. Also, a plurality of telephone numbers can be inputted in step 333. At step 335, the control section 111 temporarily registers the input telephone number in a specified region of the memory 113 and proceeds to step 339.

If the input key correspond the group key in step 327, the control section 111 proceeds to step 337. At step 337, the control section 111 scans the key input section 115 and checks if the group key is inputted therefrom. If the group number, identifying a group of previously recorded telephone numbers, is inputted, the control section 111 proceeds to step 339. At step 339, the control section checks if the SEND key for starting the message transmission is inputted from the key input section 115. If the SEND key is inputted, the control section 111 proceeds to step 341. At step 341, the control section 111 checks the memory 113, retrieves all telephone numbers registered in the group, and sequentially transmits the short message to each retrieved telephone number.

Figure 4:
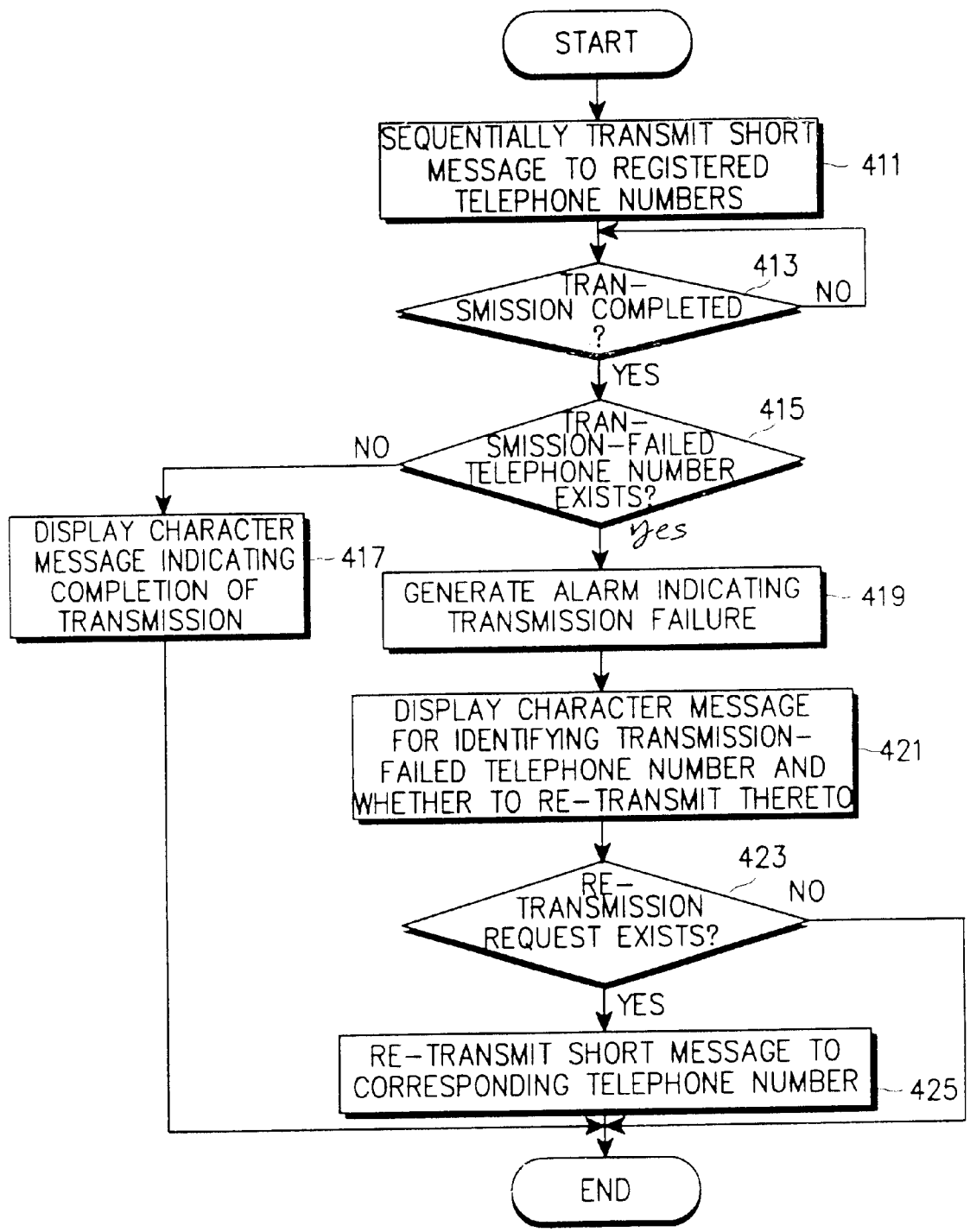

FIG. 4 is a flowchart illustrating in detail the multi-transmission process of step 341 in FIG. 3.

As shown in FIG. 4, at step 411, the control section 111 sequentially transmits the short message to the registered telephone numbers, then proceeds to step 413. As an illustrative example, the number of registered mobile terminals at the receiving end to which the control section 111 multi-transmits the short message, is 7. Then, the control section 111 transmits the short message to the first telephone number, which was the first registered number out of the 7 telephone numbers via the base station, then transmits the same short message to a second telephone number after the completion of the transmission to the first telephone number. By repeating this sequential operation, the same short message is multi-transmitted to all 7 respective telephone numbers. If any error occurs in the middle of the multi-transmission, the short message is transmitted to the next telephone number, which follows the previous telephone number to which the short message transmission failed. Thus, the multi-transmission of the short message can be completed even if there is a transmission failure to one of the 7 telephone numbers.

At step 413, the control section 111 checks whether the multi-transmission of the short message to the plurality of telephone numbers is completed. If the multi-transmission is completed as a result of checking, the control section 111 proceeds to step 415. At step 415, the control section 111 checks whether any one of the telephone numbers to which the transmission of the short message is intended has failed during the multi-transmission procedure. If no transmission-failed telephone number exists as a result of checking, the control section 111 proceeds to step 417. At step 417, the control section 111 checks the memory 113 to transmit a character message for indicating the completion of the multi-transmission, such as, for example, "The multi-transmission is completed", then displays the retrieved character message in the display section 127 and returns to the standby state.

If the transmission-failed telephone number exists as a result of checking at step 415, the control section 111 proceeds to step 419. At step 419, the control section 111 generates an alarm indicating the existence of the transmission-failed telephone number through a loudspeaker and proceeds to step 421. At step 421, the control section 111 checks the memory 113 to read out a character message for identifying the transmission-failed telephone number and to check whether a re-transmission of the transmission-failed telephone number is desired. For example, a character message would state, "123–2345: Transmission failure. Would you like to re-transmit?", would be displayed in the display section 127 and proceed to step 423. At step 423, the control section 111 scans the key input section 125 and checks whether the re-transmission is requested by the user. Here, displaying the character message for identifying the transmission failure and the choice for re-transmission, a menu option for inputting a re-transmission selection key is displayed. Accordingly, the user requests the re-transmission of the short message using the input key. However, if the re-transmission is not requested as a result of checking, the control section 111 returns to the standby state.

If the re-transmission is requested in step 423, the control section 111 proceeds to step 425. At step 425, the control section 111 transmits the short message to the telephone number subject to the re-transmission via the base station, then returns to the standby state.

As described above, the present invention provides advantages in that it can input and multi-transmit a short message to a plurality of mobile subscribers at the receiving end without repeatedly transmitting the same short message to each one of the terminating terminals. Hence, the present invention provides the user with improved convenience in achieving the multi-transmission of short message to a multi-destination.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention but that the present invention includes all embodiments falling within the scope of the appended claims.

What is claimed is:

1. A multi-destination transmission method for transmitting a short message from an originating mobile terminal to a plurality of terminating mobile terminals, comprising the steps of:

(a) pre-registering a plurality of telephone numbers of the terminating mobile terminals in different groups in a memory means of an originating mobile terminal;

(b) inputting and editing at least one short message in the originating mobile terminal;

(c) detecting a request for the multi-transmission of the inputted short message from the user of the originating mobile terminal;

(d) upon receiving the request for the multi-transmission, selecting whether to multi-transmit the short message to one of the pre-registered groups with the pre-registered telephone numbers;

(e) if one of the pre-registered groups is selected, retrieving the telephone numbers of the terminating mobile terminals registered in the selected group;

(f) multi-transmitting the short message to the retrieved telephone numbers;

(g) inputting a plurality of new telephone numbers in the originating mobile terminal if the multi-transmission to one of the pre-registered groups is not selected in step (d); and (h) upon the completion of inputting the new telephone numbers, transmitting the short message to the new telephone numbers in sequence.

2. A multi-destination transmission method for transmitting a short message from an originating mobile terminal to a plurality of terminating mobile terminals, comprising the steps of:

(a) pre-registering a plurality of telephone numbers of the terminating mobile terminals in different groups in a memory means of an originating mobile terminal;

(b) inputting and editing at least one short message in the originating mobile terminal;

(c) detecting a request for the multi-transmission of the inputted short message from the user of the originating mobile terminal;

(d) upon receiving the request for the multi-transmission, selecting whether to multi-transmit the short message to one of the pre-registered groups with the pre-registered telephone numbers;

(e) if one of the pre-registered groups is selected, retrieving the telephone numbers of the terminating mobile terminals registered in the selected group; and, (f) multi-transmitting the short message to the retrieved telephone numbers;

(g) inputting a new telephone number in the originating mobile terminal if the request for the multi-transmission of the short message is not detected from the user in step (c); and (h) transmitting the short message to the new telephone number.

3. A multi-destination transmission method for transmitting a short message from an originating mobile terminal to a plurality of terminating mobile terminals, comprising the steps of:

(a) transmitting a request for the multi-transmission of the short message from the user of the originating mobile terminal;

(b) if the request for the multi-transmission is detected, inputting, by the user, a group number corresponding to one of the previously recorded groups having a plurality of telephone numbers corresponding to the plurality of terminating mobile terminals; and, reading out the telephone numbers registered in one of the selected groups that correspond to the inputted group number; and, (c) sequentially transmitting the short message using a short message service (SMS) to the retrieved telephone numbers corresponding to the terminating mobile terminals.

4. The method as recited in claim 3, wherein the step (b) of retrieving the telephone numbers of the terminating mobile terminals comprises the steps of:

selecting, by the user, one of the previously registered groups having a plurality of telephone numbers corresponding to the plurality of terminating mobile terminals; and, reading out the telephone numbers registered in one of the selected groups.

5. The method as recited in claim 3, further comprising the steps of:

if the request for the multi-transmission group is not selected, sequentially inputting a plurality of new telephone numbers corresponding to the plurality of terminating mobile terminals to which the short message is to be multi-transmitted.

6. The method as recited in claim 3, further comprising the steps of:

upon the completion of the short message transmission, detecting if the short message transmission to one of the retrieved telephone numbers is unsuccessful;

notifying the user of the originating mobile terminal if a transmission failure to one of the telephone numbers registered in the selected group is detected;

determining whether to re-transmit the short message to the transmission-failed telephone number; and, re-transmitting the short message to the transmission-failed telephone number if the user requests the re-transmission.

7. The method as recited in claim 6, further comprising the step of notifying the completion of the transmission to the user of the originating mobile terminal if there is no transmission failure to one of the telephone numbers registered in the selected group.

8. The method as recited in claim 6, wherein the step of notifying the transmission failure to the originating mobile terminal comprises the steps of:

generating an alarm signal for indicating the transmission failure; and, displaying the transmission-failed telephone number after the generation of the alarm signal.

9. A multi-destination transmission method for transmitting a short message from an originating mobile terminal to a plurality of terminating mobile terminals, comprising the steps of:

(1) pre-registering a plurality of telephone numbers corresponding to a plurality of terminating mobile terminals in different groups in a memory means of the originating mobile terminal;

(2) inputting and editing at least one short message in the originating mobile terminal;

(3) detecting a request for the multi-transmission of the inputted short message from the user of the originating mobile terminal;

(4) upon receiving the request for the multi-transmission, requesting the user to select whether to multi-transmit the short message to one of the pre-registered groups having the pre-registered telephone numbers;

(5)(a) if the multi-transmission to one of the pre-registered groups is selected, retrieving the telephone numbers registered in the selected group; and, (5)(a)(i) multi-transmitting the short message to the retrieved telephone numbers;

(5)(b) if the multi-transmission to one of the pre-registered groups is not selected, inputting a plurality of new telephone numbers in the originating mobile terminal; and, (5)(b)(i) multi-transmitting the short message to the new telephone numbers in sequence upon the completion of inputting the new telephone numbers.

10. The method as recited in claim 9, wherein the step (5)(a)(i) of multi-transmitting the short message comprises the steps of:

sequentially transmitting the short message to each one of the telephone numbers registered in the selected group;

upon completion of the short message, determining if the transmission of the short message to one of the telephone numbers registered in the selected group is completed without failure;

notifying the user of the originating mobile terminal if a transmission failure to one of the telephone numbers registered in the selected group is detected; and, determining whether to re-transmit the short message to the transmission-failed telephone number.

11. The method as recited in claim 10, wherein the step of notifying the transmission failure to the originating mobile terminal comprises the steps of:

generating an alarm signal for indicating the transmission failure; and, displaying the transmission-failed telephone number after the generation of the alarm signal.

12. The method as recited in claim 9, further comprising the step of re-transmitting the short message to the transmission-failed telephone number if the user requests the re-transmission.

13. The method as recited in claim 9, wherein the step (5)(b)(i) of multi-transmitting the short message comprises the steps of:
- sequentially transmitting the short message to each one of the new telephone numbers registered;
- upon the completion of the short message transmission, determining if the short message transmission to one of the new telephone numbers is a failure;
- notifying the user of the originating mobile terminal if a transmission failure to one of the new telephone numbers registered is detected; and,
- determining whether to re-transmit the short message to the transmission-failed telephone number.

14. The method as recited in claim 13, wherein the step of notifying the transmission failure to the originating mobile terminal comprises the steps of:
- generating an alarm signal for indicating the transmission failure; and,
- displaying the transmission-failed telephone number after the generation of the alarm signal.

15. The method as recited in claim 13, further comprising the step of re-transmitting the short message to the transmission-failed telephone number if the user requests the re-transmission.

* * * * *